United States Patent
Rudisill et al.

(10) Patent No.: US 6,272,324 B1
(45) Date of Patent: Aug. 7, 2001

(54) ELECTRICAL CONNECTION FOR TELEPHONE WITH HINGED COVER

(75) Inventors: Charles A. Rudisill, Apex; Gerard J. Hayes, Wake Forest; Russell E. Winstead, Raleigh, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/162,323

(22) Filed: Sep. 28, 1998

(51) Int. Cl.[7] ........................................ H04B 1/38
(52) U.S. Cl. .................... 455/90; 455/575; 455/351; 379/433.13
(58) Field of Search ................... 439/31, 19, 20; 455/575, 90, 550, 351, 347–349, 128; 379/433, 434, 433.13; 200/61.7

(56) References Cited

U.S. PATENT DOCUMENTS

| | | | |
|---|---|---|---|
| 3,860,312 | * 1/1975 | Gordon, Jr. | 339/4 |
| 4,850,882 | * 7/1989 | Yu | 439/31 |
| 5,170,173 | * 12/1992 | Krenz | 343/702 |
| 5,237,488 | * 8/1993 | Moser et al. | 361/729 |
| 5,508,709 | * 4/1996 | Krenz | 343/702 |
| 5,542,850 | * 8/1996 | Frantz | 439/31 |
| 5,732,331 | * 3/1998 | Harms | 455/90 |

* cited by examiner

Primary Examiner—Nguyen T. Vo
(74) Attorney, Agent, or Firm—Coats & Bennett, P.L.L.C.

(57) ABSTRACT

An electrical connector establishes electrical connection between transceiver electronics disposed in a main body of the phone and remote electrical components contained in a movable cover. One or more fixed contacts operatively connected to the transceiver electronics are disposed on the main body of the phone. Movable contacts operatively connected to the remote electrical components are disposed on the cover. The movable contacts on the cover engage the fixed contacts on the main body when the cover is in the open and closed positions. Commutating contacts can be used to maintain a continuous connection as the cover travels between open and closed positions.

9 Claims, 7 Drawing Sheets

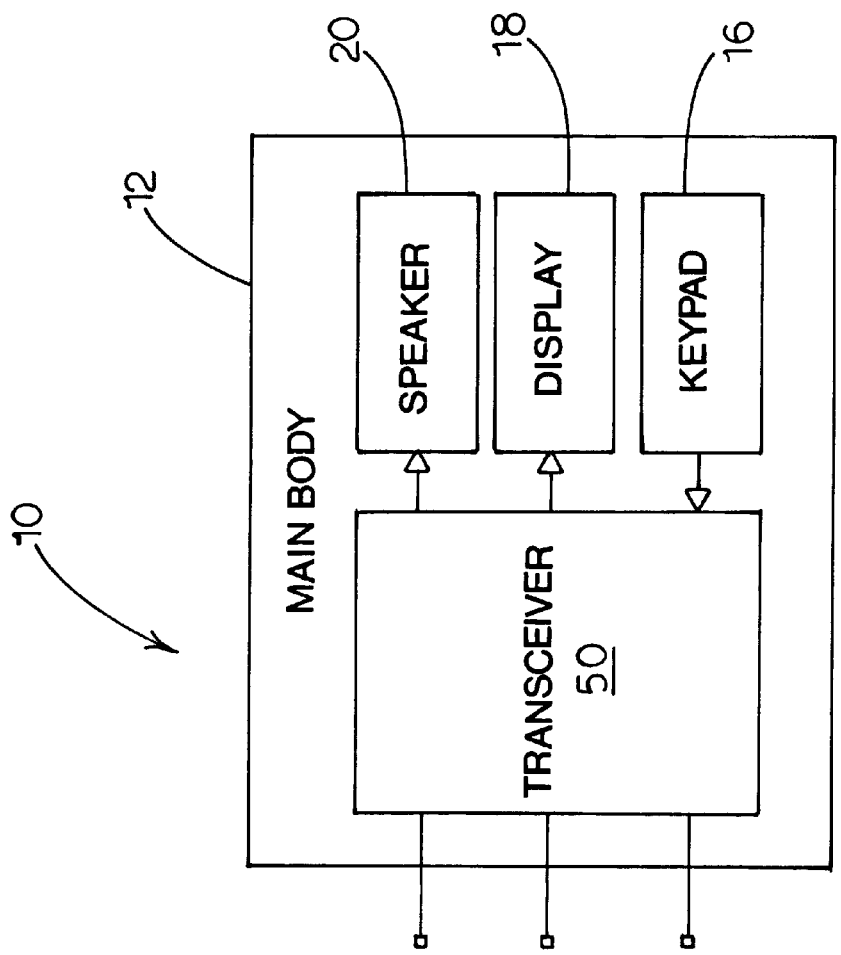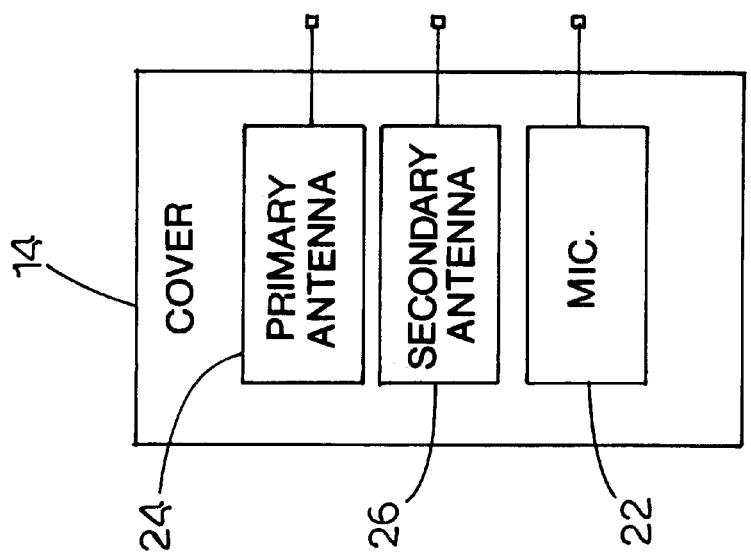
Fig. 2

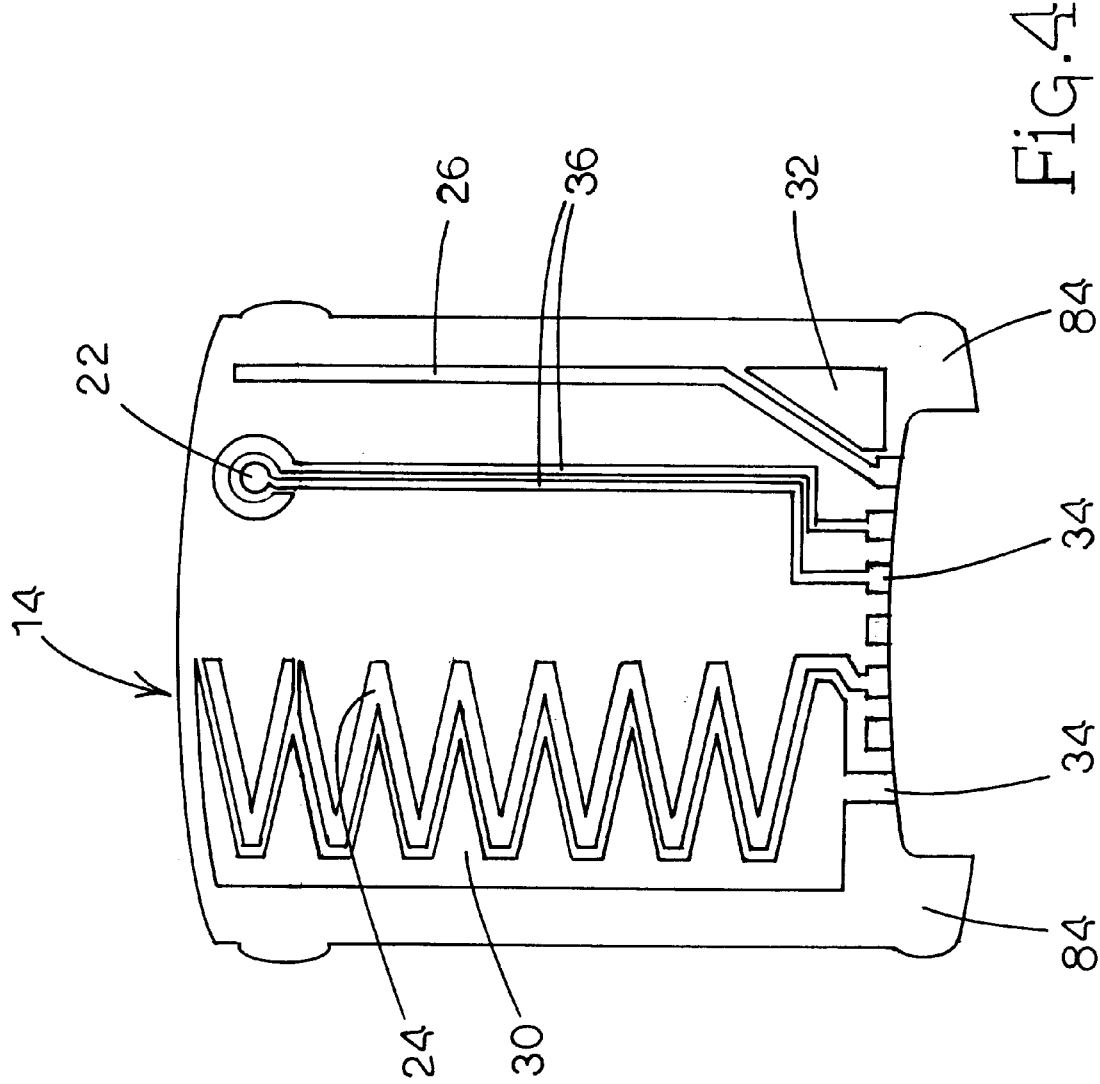

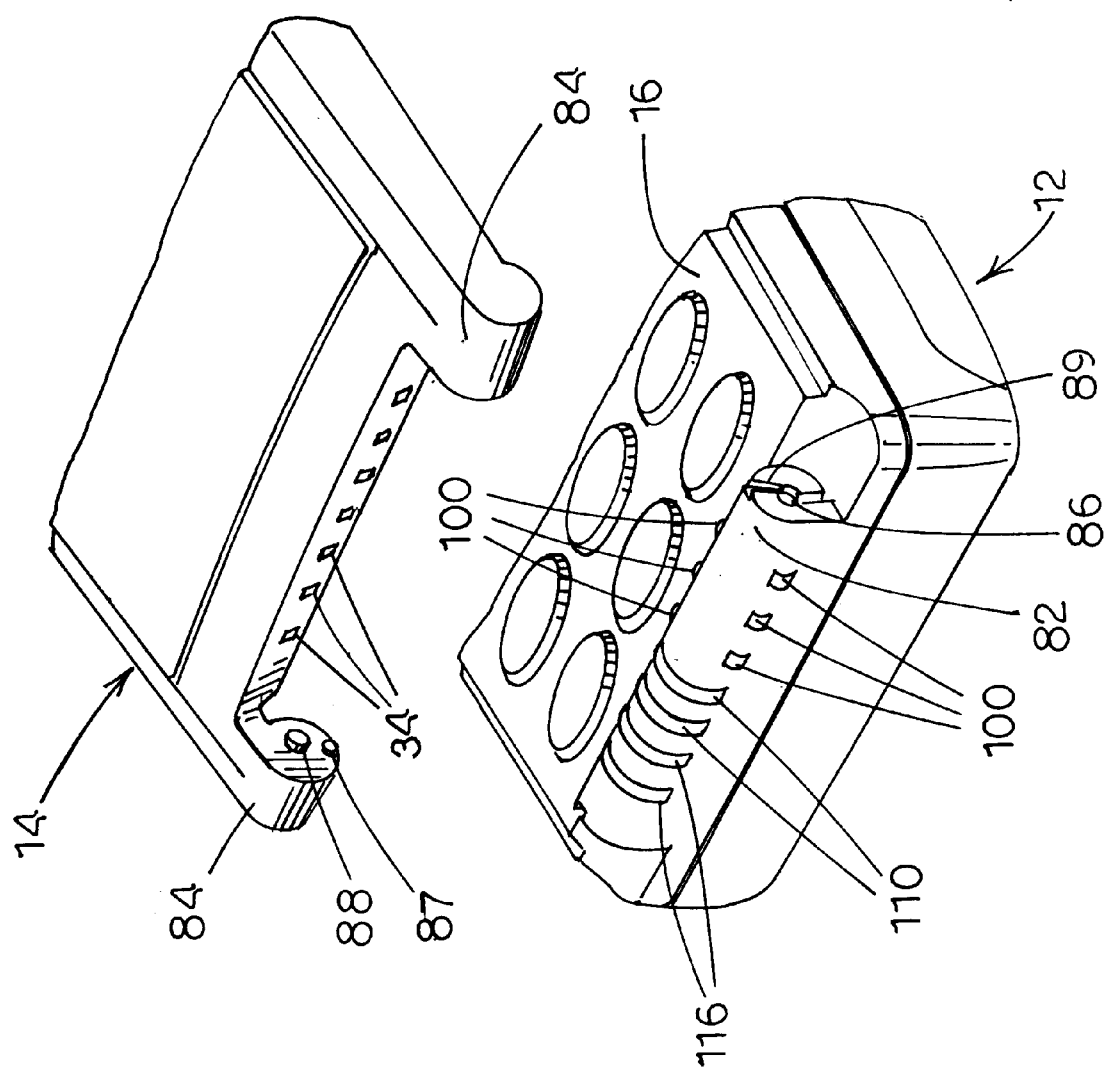

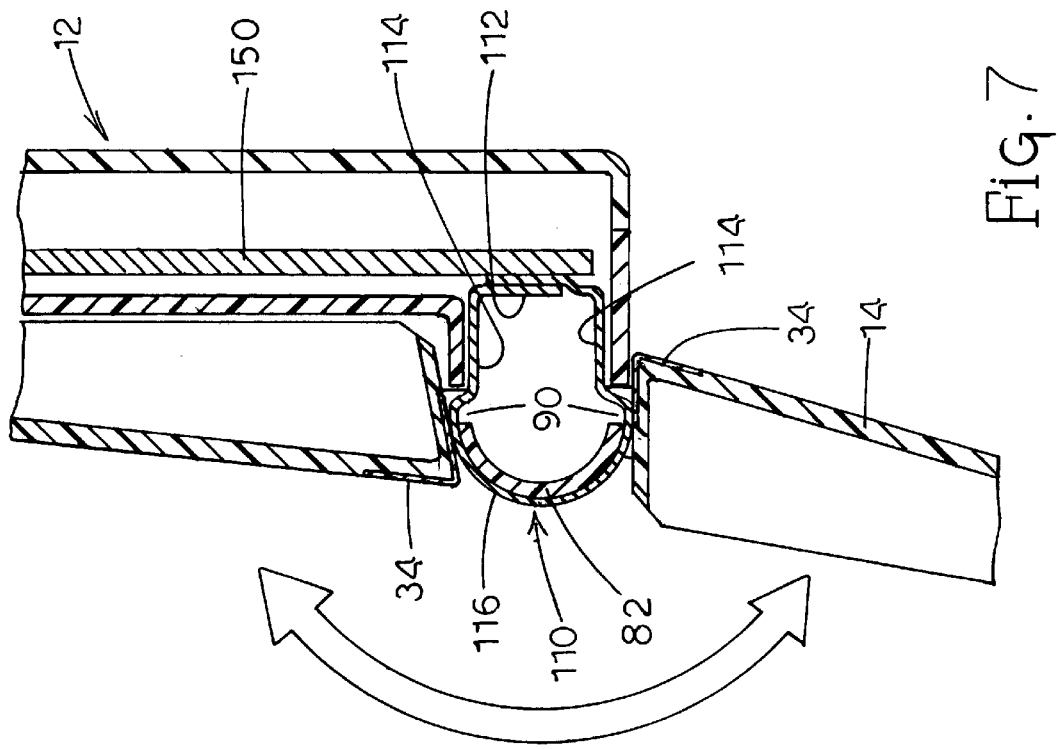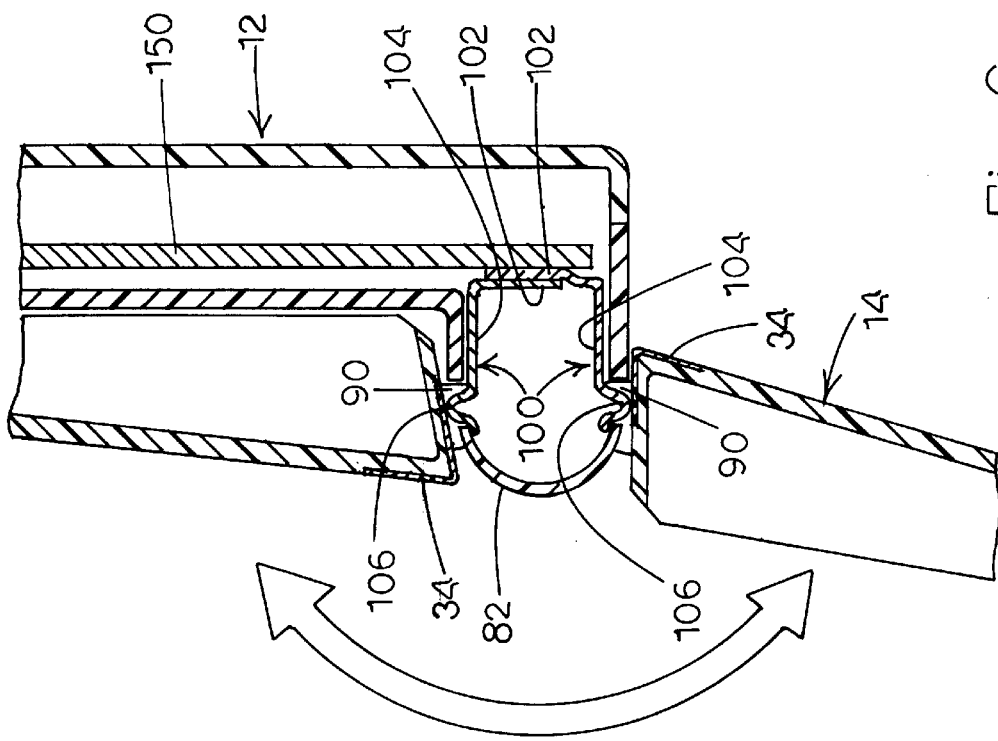

ELECTRICAL CONNECTION FOR TELEPHONE WITH HINGED COVER

FIELD OF THE INVENTION

The present invention relates generally to portable radio communication devices having a hinged cover and, more specifically, to a method and apparatus for establishing an electrical connection between transceiver electronics in the main body of the radio communications device and remote electrical components in the hinged cover.

BACKGROUND OF THE INVENTION

Cellular telephones having a hinged cover, commonly known as a flip, are offered by several manufacturers. The hinged cover is movable between open and closed positions. In the closed position, the hinged cover extends over the keypad of the telephone. In the open position, the hinged cover provides a convenient extension to the phone and, when fitted with a microphone, is well positioned to receive audio input from the user's mouth. One problem with flips or hinged covers containing electrical components is the difficulty of interconnecting the remote electrical components and/or circuits in the flip to the transceiver electronics in the main body of the phone. One approach is to utilize flex circuits extending through the hinge to establish the necessary electrical connections. This approach, however, presents several disadvantages including concern about the durability of the flex circuit during high-cycle flexing, difficulty of assembly, and increased costs. Also, when antennas are integrated into the flip, R/F performance of the antenna can be adversely affected by the flex cable design unless carefully controlled impedance matching is included in designs.

Another method of connecting remote electronics in a hinged cover to the transceiver electronics in the main body of the phone is to use discrete wires routed through the hinge. The main problem with this approach is that the hinge is relatively small and thus only a limited number of cables or wires can be accommodated. Further, routing of RF signals through the hinge is difficult since coaxial cables are needed which require a large volume. A further problem is the difficulty of predicting and testing the life of a highly flexed cable assembly which is repeatedly twisted in this manner. Thus, this approach limits the number and type of electronics that can be placed on the hinged cover.

Another drawback of using flex cables or discrete wires to make electrical connections between the main body and hinged cover is that the hinged cover cannot be removed. This is a major concern since phones are frequently dropped. To prevent or repair damage to the flip, it is desirable to design the flip in such a way that the flip can be practically detached and reattached from the main body when exposed to excessive forces or replacement needs. When this occurs, the cabling or wiring may be pulled loose or otherwise damaged rendering the phone inoperable.

Accordingly, there is a need for a new method and apparatus for making an electrical connection between remote electronics contained in a hinged cover and transceiver electronics disposed in the main body of a radiotelephone.

SUMMARY OF THE INVENTION

The present invention is a portable radio communication device including a main body section housing the transceiver electronics and a hinged cover. One or more remote electrical components or circuits are disposed on the hinged cover. The remote electrical components/circuits may include, for example, a microphone, antenna, RF amplifier and impedance matching circuits. Fixed contacts on the main body and movable contacts on the hinged cover are used to establish an electrical connection between the remote electronics in the hinged cover and the transceiver electronics in the main body. In a preferred embodiment, the fixed contacts are mounted in a portion of the hinge, and the movable contacts are mounted along a bottom edge of the hinged cover. Using contacts to make the electrical connection between the main body and the hinged cover eliminates the need for flex cables or discrete wires routed through the hinge.

In a preferred embodiment of the invention, the main body includes first and second sets of fixed contacts. The first set of fixed contacts establishes an electrical connection between the hinged cover and main body when the hinged cover is in the closed position. The second set of contacts maintains the electrical connection when the hinged cover is in an open position. When the hinged cover travels between the closed position and open position, the electrical connection is momentarily broken. However, continuous contact is not necessary since the phone may be programmed to allow for a time delay. If it is desired to maintain a continuous electrical connection between the hinged cover and the main body, commutating contacts can be used to maintain the electrical connections throughout the entire range of movement of the hinged cover.

In another aspect of the invention, detent features can be incorporated into the fixed contacts on the main body and the movable contacts on the hinged cover. Detent features integrally formed in the contacts could be used either in place of or conjunction with mechanical detents on the hinge itself.

Other objects and advantages of the present invention will become apparent and obvious from a study of the following description and the accompanying drawings which are merely illustrative of such invention.

BRIEF DESCRIPTION OF THE DRAWINGS

FIG. 2 is a schematic block diagram of a portable radio telephone constructed in accordance with the present invention.

FIG. 4 is a plan view of the hinged cover showing the circuits for electrical components which can be mounted thereon.

FIG. 5 is a partial perspective view of the radiotelephone showing the construction of the hinge for attaching the cover to the main body of the phone.

FIG. 6 is a section view of the radiotelephone showing a first embodiment using discontinuous contacts for the open and closed position.

FIG. 7 is a section view of the radio telephone showing a continuous commutating contact.

DETAILED DESCRIPTION OF THE INVENTION

Figure 1:
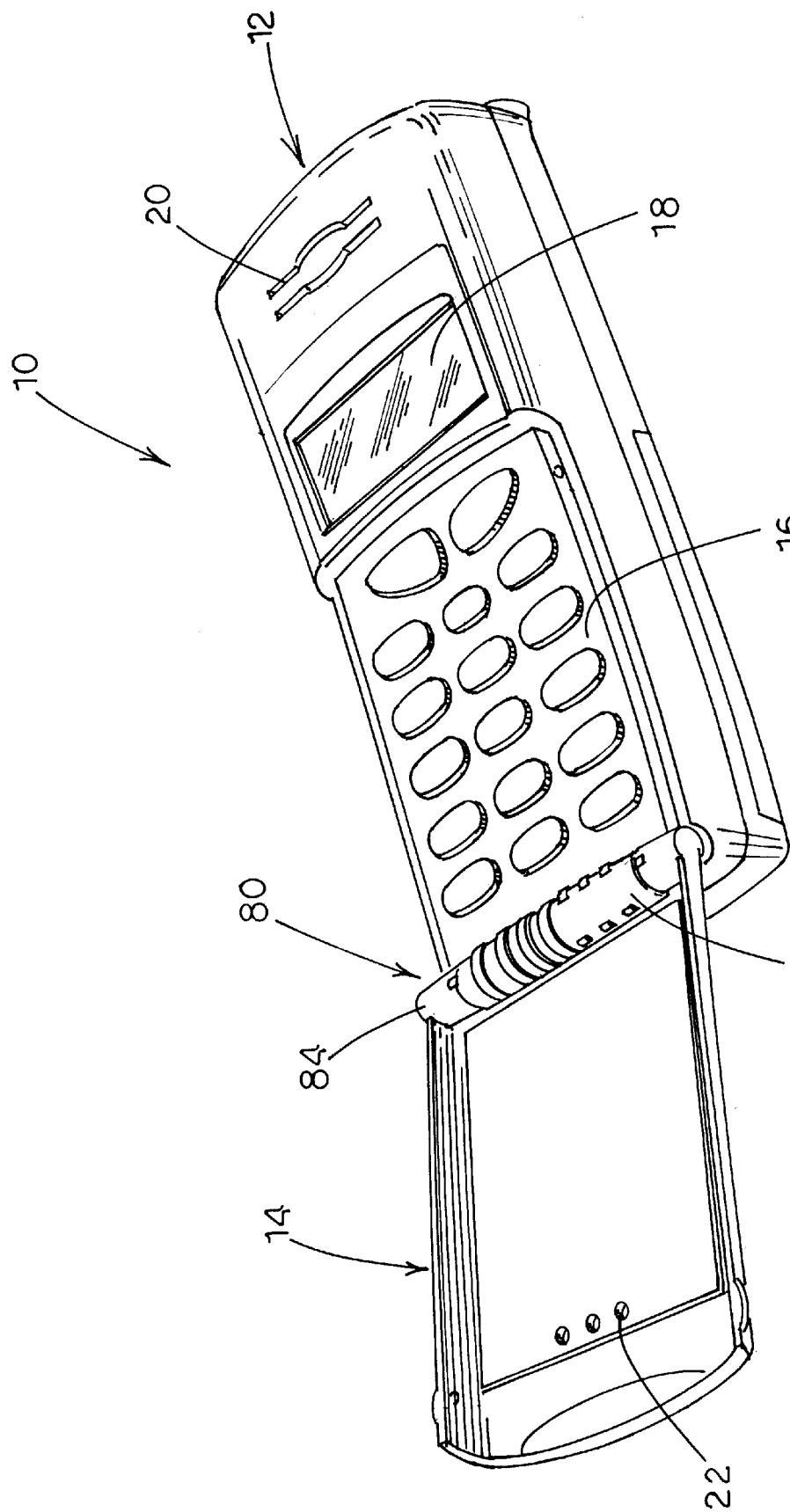
FIG. 1 is a perspective view of a portable radio telephone constructed in accordance with the present invention.

FIGS. 1 and 2 illustrate a hand-held radiotelephone 10 constructed in accordance with the present invention. The radiotelephone 10 includes a main body 12 and a hinged cover 14. The main body 12, which contains the transceiver electronics 50, includes a keypad 16, a display 18 and a speaker 20. The hinged cover 14 contains a microphone 22, a primary antenna 24, and a secondary antenna 26. These remote electrical components are operatively connected to the transceiver electronics 50 in the main body of the radiotelephone by mating contacts on the hinged cover 14 and main body 12 of the radiotelephone 10 as will be hereinafter described.

The keypad 16 allows the operator to dial numbers, enter commands, and select options. The display 18 allows the operator to see dialed digits, call status information, and prompts. The microphone 22 converts the user's speech or other audible input into analog audio signals that are transmitted as hereinafter described. Speaker 20 converts received audio signals to an audible output that can be heard by the user. The primary antenna 24 may be, for example, a grounded monopole antenna for dual band communication with a base station in a cellular communication network. The secondary antenna 26 is an auxiliary antenna that operates at the same frequency band as the primary antenna, such as a diversity antenna, or an additional antenna that operates at an alternate frequency band, such as MC-Link (data communications) at 2.4 GHz or GPS (global positioning system) at 1500 MHz.

Figure 3:
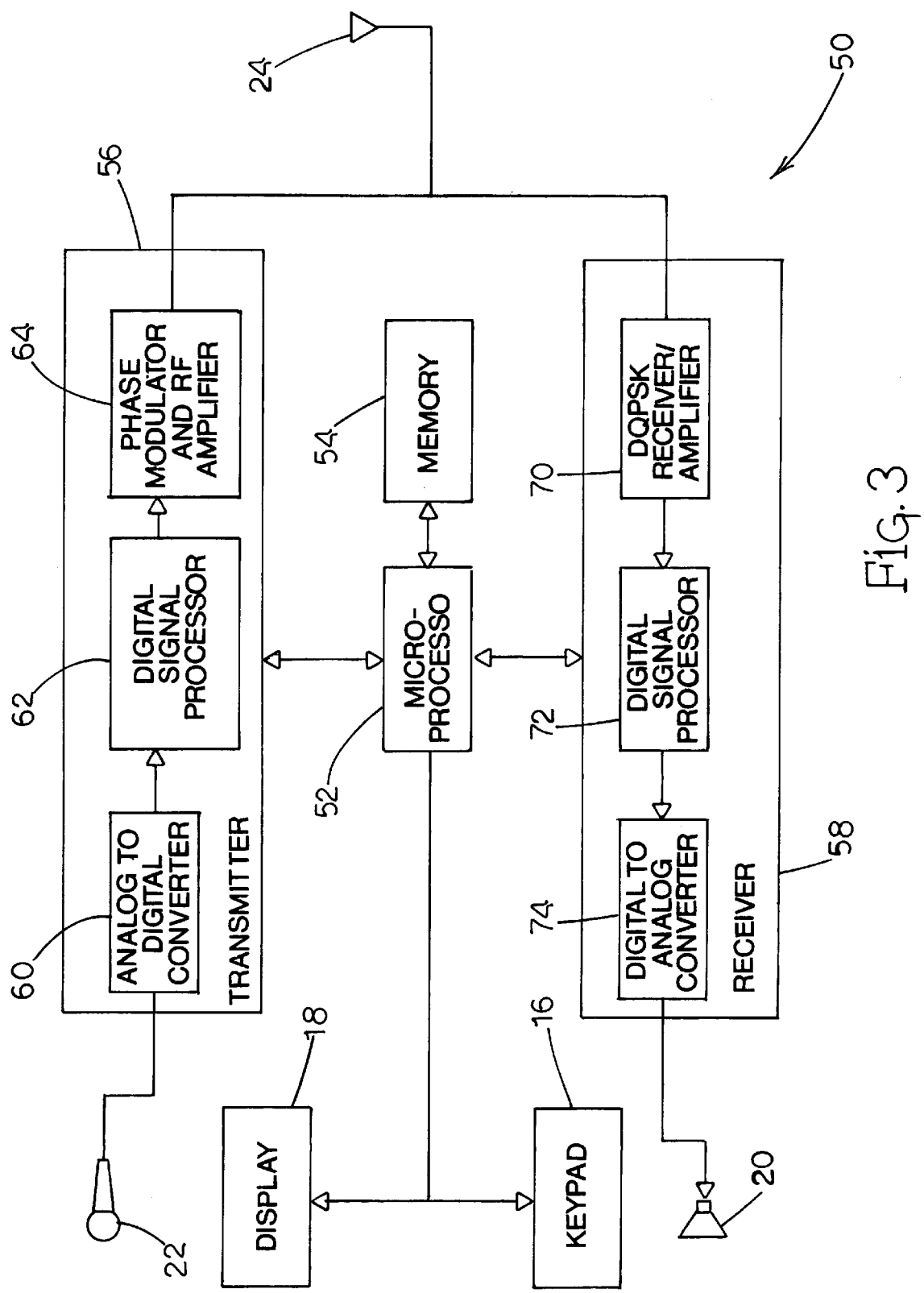
FIG. 3 is a more detailed block diagram of the portable radiotelephone of the present invention.

The transceiver electronics 50, shown in FIG. 3, include all the circuits necessary for a fully functional transceiver. Typically, the transceiver electronics 50 includes a microprocessor 52, a program memory 54, a transmitter 56, and a receiver 58. The analog audio signals from the microphone 22 are applied to the transmitter 56, which processes the signals for transmission on a RF carrier. Received RF signals picked up by the antenna 24 are passed through the hinged contacts (34,100,110) described in this invention to the receiver 58 which processes the signals. Audio signals are similarly passed through the hinged contacts (34,100,110) to the speaker 20 while control signals or information signals are similarly passed to the microprocessor 52.

The transmitter 56 typically includes an analog to digital converter 60, a digital signal processor 62, a phase modulator 64 and RF amplifier 66. The analog to digital converter 60 converts the analog audio signals from the microphone 22 into a digital audio signal. The digital audio signal is passed to the digital signal processor 62 which compresses the digital audio signal and inserts error detection, noise cancellation, error correction and signaling information. The compressed and encoded signal from the digital signal processor 62 is passed to the modulator 64. The modulator 64 converts the signal to a form that is suitable for transmission on a RF carrier. The RF amplifier 66 boosts the output of the modulator 64 for transmission via the antenna 24.

The receiver 58 includes a detector/amplifier 70, digital signal processor 72, and a digital to analog converter 74. Digital signals received by the antenna 24 are passed to the detector/amplifier 70 which boosts the low-level RF digital signal to a level appropriate for input to the digital signal processor 72. The digital signal processor 72 includes an equalizer to compensate for phase and amplitude distortions in the channel corrupted signal, and a demodulator for extracting the transmitted bit sequence from the received signal. A channel decoder detects and corrects channel errors in the received signal. The channel decoder also separates control and signaling data from speech data. The control and signaling data is passed to the microprocessor 52. Speech data is passed to the digital to analog converter 74. Digital to analog converter 74 converts the digital audio signal into an analog output signal. The analog output signal is amplified by amplifier and passed to the speaker 20 to generate an audible output that can be heard by the user.

The microprocessor 52 coordinates the operation of the transmitter 56 and the receiver 58 according to program instructions stored in memory 54. These functions include power control, channel selection, timing, as well as a host of other functions. The microprocessor 52 inserts signaling messages into the transmitted signals and extracts signaling messages from the received signals. The microprocessor 52 responds to any base station commands contained in the signaling messages, and implements those commands. The microprocessor also accommodates typical delays or interruptions caused by the hinged contacts. When the user enters commands via the keypad 16, the commands are transferred to the microprocessor 52 for action. Since the design and operation of transceivers is not material to understand the present invention and is well-known to those skilled in the art, further description of the transceiver electronics 50 is omitted for the sake of brevity.

FIG. 4 is a plan view of a hinged cover 14 showing one possible arrangement of remote electrical circuit lines and features for components. As previously described, the elements placed on the hinged cover 14 include a microphone 22, a primary antenna 24, and a secondary antenna 26. Ground elements 30, 32 for the primary antenna 24 and secondary antenna 26 are formed on the cover 14. The microphone 22 is contained in a small recess in the cover 14. Each electrical component on the hinged cover 14 is connected by narrow traces 36 to a corresponding contact pad 34 formed along the bottom edge of the cover 14. As will be described in greater detail below, the contact pads 34 are used to establish electrical connection to the transceiver electronics 50 in the main body 12 of the radiotelephone.

The antennas 24, 26 and ground elements 30, 32 and traces 36 can be made by photoimaging these elements on a substrate, i.e. the cover 14. The hinge cover 14 is first molded from a polymer material, preferably in panel form. Possible substrate materials include engineering polymers such as nylon, ABS, polycarbonate, ABS/PC, polyeterimide, etc. Platability, adhesion, mechanical and electrical properties are the key considerations in selecting a suitable material. The cover 14 is molded with mechanical features such a recess for the microphone, guides, detents, and raised areas for the contact pads 34. The panel and substrates are plated to define the conductive patterns on the cover 14. Plating would typically be gold over nickel over copper. Various platings such as hard gold and palladium-nickel alloys may be used to provide increased wear resistance. Conformal masks, flat masks, various forms of projection printing, and laser writing may be used for photoimaging. These processes are very similar to circuit board manufacturing with the exception of the pre-treatment of the substrate prior to plating and the specific type of photoimaging used. Once the conductive patterns are formed on the substrate, discrete elements such as matching components and amplifiers for the antennas or microphones or other electronic devices located on the cover can be added onto the substrate. The parts are subsequently dipped, painted, covered with a molded or flat cover sheet, or overmolded to cover and protect the conductive elements and provide the desired aesthetic appearance. Portions of the conductive patterns could be left exposed for aesthetic reasons. In this case, the conductive patterns could be recessed into the surface of the cover 14 to avoid abrasion.

An alternative non-masking method of forming the cover 14 would be to use a two-shot molding process and selectively plating the surfaces between shots. If thin substrates are used, two-shot molding is probably not suitable. Delamination of the cover 14 is also a concern if two-shot molding is used. Other methods for making the cover 14 include insert molding, foil stamping and flex circuitry. These methods are generally considered to be less desirable and more expensive than photoimaging methods.

In the past, it has been common practice to use either flex cables or discrete wires to make the needed electrical connections between the remote electrical components disposed on the hinged cover 14 and the transceiver electronics 50 in the main body 12 of the radiotelephone 10. The present invention, in contrast, employs fixed and moving contacts to make the electrical connection between the remote electrical components on the hinged cover and the transceiver electronics 50. The fixed contacts 100,116,110 are disposed on the main body 12 of the radiotelephone 10. Contact pads 34 on the hinged cover 14 serve as moving contacts. The movable contacts 34 engage the fixed contacts 100 when the hinged cover 14 is in either the open or closed positions to establish electrical connection between the hinged cover 14 and the main body 12 of the radiotelephone 10. The intermittent engagement of the contacts during opening can also be useful for "signalling" the microprocessor that the user is answering or initiating a call. When used in reference to contacts, the term "engages" means that two contacts are in electrical communication with one another, and is not limited to direct physical contact. The term "engages" includes, without limitation, capacitive coupling, inductive coupling, and magnetic coupling of two contacts with one another.

As shown in FIG. 5, the hinged cover 14 of the radiotelephone 10 is attached to the main body 12 by means of a hinge 80. In a preferred embodiment of the invention, the fixed contacts 100 are incorporated into or located near the hinge 80. The hinge 80 includes a generally cylindrical hinge member 82 integrally formed with the front cover of the main body 12. A small recess 86 is centrally located at each end of the hinge member 82. Hinge arms 84 are integrally formed with the hinged cover 14. The hinge arms 84 are spaced from one another so that the hinge member 82 is received between the opposing hinge arms 84. Each hinge arm 84 include a pivot member 88 disposed along the axis of rotation of the hinge cover 14. The pivot members 88 engage the recesses 86 in respective ends of the hinge member 82 to secure the hinged cover 14 to the main body 12. The hinge arms 84 also include detents 87 to hold the hinged cover 14 in the open and closed positions. The detents 87 engage corresponding recesses or slots 89 in the end of the hinge member 82. A hinge 80 as described herein is currently used in the Model AF 738 phone manufactured by Ericsson, Inc. without the fixed contacts 100 or movable contacts 34.

Fixed contacts 100 are incorporated into the hinge member 82 on the main body 12 of the radiotelephone 10. FIG. 6 is a cross-section of the hinge 80 showing one embodiment that uses discontinuous contacts. The hinge member 82 includes a series of contact openings 90 aligned with or corresponding to the open and closed positions. In the embodiment shown in FIG. 6, a first set of fixed contacts 100 are used to make electrical connection when the hinged cover 14 is in the closed position and a second set of contacts 100 is used when the hinged cover 14 is in the open position. Each set includes a plurality of discrete contacts. The contacts are made from narrow strips of conductive material such as beryllium-copper or phosphor-bronze as is common for connectors. The fixed contacts 100 include a base portion 102 that mounts onto a printed circuit board 150 that contains the transceiver electronics 50. The contacts 100 are preferably surface mounted on the printed circuit board 150. The contacts can also be made and attached to the circuit board as completely separate electrical contacts for the open and closed contacts. This can enable a multitude of "switching" and other electro-mechanical functionality. Vertical contact arms 104 extend upward from the printed circuit board. The vertical contact arms are made to provide ample deflection and "spring" for reliable operation of the contacts. The upper end of the contact arm 104 includes a protruding portion 106 that forms the fixed contact and projects through a corresponding opening 90 in the hinge member 82 of the hinge. The protruding portion 106 of the contact 100 engages a respective movable contact 34 on the hinged cover 14. Contacts 100 in the first set of contacts engage the movable contacts 34 when the hinged cover 14 is in the closed position. Contacts 100 in the second set of contacts engage the movable contacts 34 when the hinged cover 14 is in the open position.

The contacts 100 in the first and second set may be formed independently as shown in FIG. 6. Alternatively, the contacts 100 in the first set of contacts may be integral with corresponding contacts 100 in the second set of contacts. For example, the first contact 100 in the first set of contacts may be integral with the first contact 100 in the second set of contacts, the second contact 100 in the first set of contacts may be integral with the second contact 100 in the second set of contacts, etc. The design of the contacts 100 would remain substantially the same except that two contacts 100 (one for the first set of contacts and one for the second set of contacts) would extend up from a common base 102. In other words, the contacts 100 in the first and second sets would be connected along their base.

In certain cases, it may be desirable to make an electrical connection between a component in the hinge cover 14 when the hinged cover 14 is in one position but not when it is in the other position. For example, RF signals may be routed to an antenna mounted to the main body 12 when the hinged cover 14 is in the closed position and to an antenna 24 on the hinged cover 14 when the hinged cover 14 is in the open position. In this example it is desirable to disconnect the antenna 24 on the hinged cover 14 when the hinged cover 14 is in the closed position. To disconnect the antenna 24 on the hinged cover 14 when the hinged cover 14 is in the closed position, a contact 100 for the antenna 24 is provided in the second set of contacts without a corresponding contact 100 in the first set of contacts. When the hinged cover 14 is closed, the electrical connection to the antenna 24 will be broken.

FIG. 7 shows a fixed, commutating contact 110 that maintains continuous electrical connection between the remote electrical components on the hinged cover 14 and the transceiver electronics 50 in the main body 12 of the radiotelephone 10. In this embodiment, the openings 90 in the hinge member 82 of the hinge are slots that extend through the hinge member 82. The contact 110 includes a base portion 112 that mounts to a printed circuit board, vertical arms 114, and an arcuate portion 116 that connects the vertical arms 114. The arcuate portion 116 projects out of the slot 90 in the hinge member 82 as shown best in FIG. 6. The movable contact 34 on the hinged cover 14 maintains continuous sliding engagement with the contact 110 as it travels from the closed position to the open position. It will be apparent to those skilled in the art that, depending on the objectives of the designer, continuous contacts 110 and discontinuous or switching contacts 100 can be used as needed.

Figure 8:
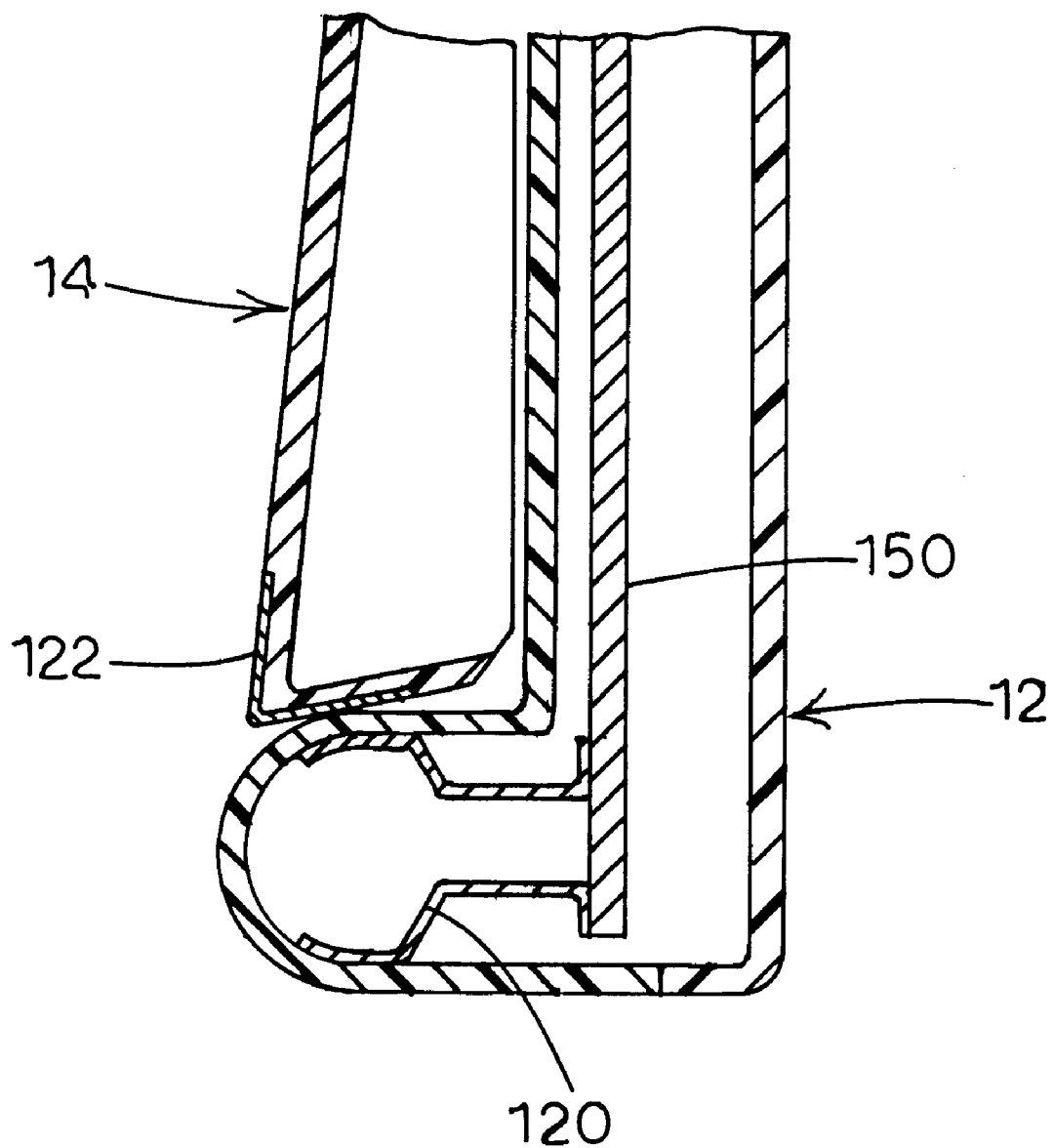
FIG. 8 is a section view of the radio telephone showing a capacitive contact.

Another embodiment that is useful is one employing capacitive contacts as shown in FIG. 8. In this arrangement, the fixed or moveable contact, 120, 122 respectively, are separated by an insulator to prevent direct contact, but also to ensure consistent spacing of the contacts 122, 124. In this embodiment, the housing 12 may serve as the insulator that separates the two contacts and forms the capacitor dielectric. Alternatively, one of the contacts 120, 122 may have a thin film of dielectric material applied thereto. The fixed and moveable contacts 120,122 in this arrangement function like capacitor plates. The area, spacing, and dielectric properties of the contacts 120, 122 must be selected to perform at the desired frequencies.

The present invention is that it provides a relatively simple, inexpensive and reliable method for making an electrical connection between components on a hinged cover and the transceiver electronics 50 in the main body 12 of the radiotelephone 10. Variations in the conductive patterns can be made by relatively simple artwork changes. Moreover, variations in conductor/ground plane separation are possible on discrete areas of the substrate allowing customization of transmission line (such as microstrip line or co-planar waveguide) characteristics. The electrical characteristics of the traces can be easily controlled leading to improved designs.

The examples shown herein illustrate application to a bottom opening flip which covers the keypad of the radio-telephone. The same principles can be applied to flips or hinged covers at other locations on the phone.

What is claimed is:

1. A portable radiotelephone comprising:

a) a main body housing transceiver electronics;

b) a cover attached to said main body and movable between open and closed positions;

c) at least one remote electrical component mounted in said cover;

d) a first fixed contact mounted on said main body operatively connected to said transceiver electronics in said main body;

e) a second fixed contact mounted on said main body operatively connected to said transceiver electronics in said main body;

f) at least one movable contact mounted on said cover and connected to said remote electrical component for engaging said first fixed contact when said cover is in said closed position and for engaging said second fixed contact when said cover is in an open position to establish a wireless electrical connection between said remote electrical component in said cover and said transceiver electronics in said main body.

2. The portable radiotelephone according to claim 1 further including a hinge member on said main body for pivotally mounting said cover to said main body.

3. The portable radiotelephone according to claim 1 wherein said first and second fixed contacts are disposed on said hinge member.

4. The portable radiotelephone according to claim 3 wherein said hinge member includes a series of contact openings and wherein said first and second contacts are disposed inside said hinge member, said first and second contacts including a contact surface exposed by said contact openings in said hinge member.

5. The portable radiotelephone according to claim 1 wherein said remote electrical component comprises a microphone.

6. The portable radiotelephone according to claim 1 wherein said remote electrical component comprises an antenna.

7. The portable radiotelephone according to claim 1 wherein said remote electrical component comprises a RF amplifier and antenna.

8. The portable radiotelephone according to claim 1 wherein said cover lies over said keypad when the cover is in the closed position.

9. The portable radiotelephone according to claim 1 wherein said fixed and moveable contacts are capacitively coupled when said cover is in the open and closed positions.

* * * * *